US012530044B2

(12) United States Patent
Hagrou et al.

(10) Patent No.: US 12,530,044 B2
(45) Date of Patent: Jan. 20, 2026

(54) MICROCONTROLLER INCLUDING A REFERENCE VOLTAGE GENERATOR CIRCUIT

(71) Applicant: STMicroelectronics International N.V., Geneva (CH)

(72) Inventors: Ayoub Hagrou, Aix-En-Provence (FR); Cedric Thomas, Aix-En-Provence (FR)

(73) Assignee: STMicroelectronics International N.V., Geneva (CH)

( * ) Notice: Subject to any disclaimer, the term of this patent is extended or adjusted under 35 U.S.C. 154(b) by 185 days.

(21) Appl. No.: 18/394,621

(22) Filed: Dec. 22, 2023

(65) Prior Publication Data

US 2024/0210984 A1 Jun. 27, 2024

(30) Foreign Application Priority Data

Dec. 23, 2022 (FR) ....................................... 2214369

(51) Int. Cl.
*G05F 3/26* (2006.01)
*G05F 1/46* (2006.01)

(52) U.S. Cl.
CPC .............. *G05F 3/267* (2013.01); *G05F 1/468* (2013.01)

(58) Field of Classification Search
CPC ............. G05F 1/468; G05F 3/267; G05F 3/30
See application file for complete search history.

(56) References Cited

U.S. PATENT DOCUMENTS 7,737,675 B2 6/2010 Murase
2009/0085651 A1* 4/2009 Liu ........................... G05F 3/30 327/539
2018/0074532 A1 3/2018 Mandal et al.
2019/0155323 A1* 5/2019 Kim ......................... G01K 7/01
2019/0278316 A1 9/2019 Lee et al.

FOREIGN PATENT DOCUMENTS

JP S5688515 A 7/1981
JP 2011220777 A 11/2011

* cited by examiner

*Primary Examiner* — Jue Zhang
*Assistant Examiner* — Lakaisha Jackson
(74) *Attorney, Agent, or Firm* — Slater Matsil, LLP

(57) ABSTRACT

A microcontroller includes a reference voltage generator circuit having a first transistor coupled as a diode, a second transistor coupled as a diode, a first variable resistor, an operational amplifier having a first input connected to the first transistor via the first variable resistor, and a second input connected to the second transistor, and second variable resistor having a first terminal connected to the second transistor and to the second input of the operational amplifier. A current mirror is controlled by an output of the operational amplifier and configured to replicate the current proportional to an absolute temperature of the second variable resistor. A current copier branch is connected to the second transistor via a switch, the current copier branch being configured to replicate the current proportional to the absolute temperature of the second variable resistor and inject the current through the second transistor.

24 Claims, 2 Drawing Sheets

MICROCONTROLLER INCLUDING A REFERENCE VOLTAGE GENERATOR CIRCUIT

CROSS-REFERENCE TO RELATED APPLICATIONS

This application claims the benefit of French Patent Application No. 2214369, filed on Dec. 23, 2022, which application is hereby incorporated herein by reference.

TECHNICAL FIELD

Embodiments relate to microcontrollers and more particularly those comprising a reference voltage generator circuit independent of temperature.

BACKGROUND

In general, a microcontroller is configured to address a dedicated application. The microcontroller comprises several electronic modules configured to implement functions in the context of the application addressed by this microcontroller.

A microcontroller may comprise a reference voltage generator circuit. In general, this circuit is referred to by the expression "bandgap voltage reference." Such a circuit is configured to generate a reference voltage independent of absolute temperature. Next, this reference voltage may be used by different electronic modules of the microcontroller. Moreover, this circuit may also generate polarization current, current dependent on absolute temperature and reference currents.

The microcontroller may have several operating modes in order to adapt its electric consumption according to its needs.

For example, the microcontroller comprises an operating mode, called normal operating mode, and another operating mode, called low-consumption operating mode.

The normal operating mode corresponds to a mode in which the modules of the microcontroller are electrically powered so as implement their functions to address the application for which the microcontroller is dedicated. For example, in the normal operating mode, the powered electronic modules may consist of digital processing modules, a flash memory, or analog peripheral modules such as an analog-to-digital converter, a digital-to-analog converter, and a power management unit.

The low-consumption mode corresponds to a mode in which most modules of the microcontroller are not electrically powered. This low-consumption mode is used when the application for which the microcontroller is dedicated does not require the implementation of the functions of the modules of the microcontroller for a given period of time. For example, in the low-consumption mode, only the reference voltage generator circuit and a power supply monitoring circuit are powered. This power supply monitoring circuit then uses the reference voltage to compare it with the power supply voltage. The low-consumption mode is intended to minimize the electric consumption of the microcontroller when the functions of the microcontroller are not implemented.

In the normal operating mode, at least some of the powered electronic modules generally require receiving a more accurate reference voltage than that required by the few modules powered in the low-consumption mode. The low-consumption mode generally requires minimizing the electric consumption of the reference voltage generator circuit.

Hence, the operating modes of the microcontrollers may have opposing needs in terms of accuracy of the reference voltage and electric consumption of the reference voltage generator circuit.

In order to address these opposing needs, the microcontroller may comprise two reference voltage generator circuits. A first reference voltage generator circuit may then be optimized to supply an accurate reference voltage for the normal operating mode, and a second reference voltage generator circuit may be optimized to consume relatively less electricity for the low-consumption mode. This solution has the drawback of using two reference voltage generator circuits which clutter up the microcontroller and which are expensive to manufacture.

Alternatively, it is possible to provide for a unique reference voltage generator circuit able to operate intermittently according to different duty cycles depending on the operating mode of the microcontroller. Such a reference voltage generator circuit has the drawback of having a complex structure and using many electronic components to adapt its operating duty cycle.

SUMMARY

Embodiments relate to microcontrollers, for example, microcontrollers comprising a reference voltage generator circuit independent of temperature.

Embodiments can provide a reference voltage generator circuit with a simple structure adapted to generate an accurate reference voltage when the microcontroller is in its normal operating mode and to reduce its electric consumption when the microcontroller is in its low-consumption mode.

In one aspect, a microcontroller comprises a reference voltage generator circuit. The reference voltage generator circuit comprises a first transistor coupled as a diode, a second transistor coupled as a diode, and a first variable resistor. The first transistor and the second transistor re configured to generate a current proportional to an absolute temperature of the first variable resistor. An operational amplifier has a first input connected to the first transistor via the first variable resistor and a second input connected to the second transistor. A second variable resistor has a first terminal connected to the second transistor and to the second input of the operational amplifier and a second terminal connected to a reference voltage node. A current mirror is controlled by an output of the operational amplifier and configured to replicate the current proportional to an absolute temperature of the second variable resistor. A current copier branch is connected to the second transistor via a switch. The current copier branch is configured to replicate the current proportional to the absolute temperature of the second variable resistor and inject the current through the second transistor. A control unit is configured to control the switch of the current copier branch and to adapt resistive values of the first variable resistor and of the second variable resistor so as to keep a reference voltage carried on the reference voltage node independent of temperature.

BRIEF DESCRIPTION OF THE DRAWINGS

Further advantages and features of the invention will become apparent on studying the detailed description of embodiments, which are in no way restrictive, and the appended drawings wherein.

DETAILED DESCRIPTION

Figure 1:
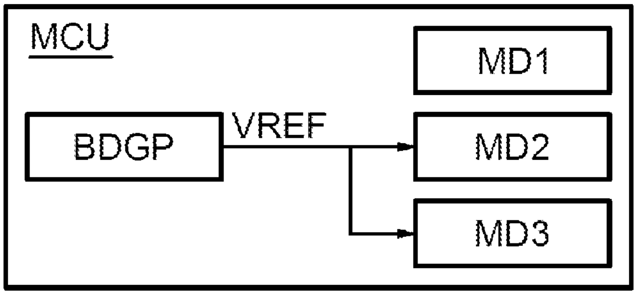
FIG. 1 illustrates a microcontroller according to an embodiment.

According to one aspect, a microcontroller comprise a reference voltage generator circuit that includes a first transistor and a second transistor mounted as a diode and a first variable resistor. The first transistor and the second transistor are configured to generate a current proportional to the absolute temperature in this first resistor. An operational amplifier has a first input connected to the first transistor via the first variable resistor, and a second input connected to the second transistor. A second variable resistor has a first terminal connected to the second transistor and to the second input of the operational amplifier and a second terminal configured to deliver a reference voltage. A current mirror is controlled by an output of the operational amplifier and is configured to replicate the current proportional to the absolute temperature in the second resistor. At least one additional current copier branch is connected to the second transistor via at least one switch and is configured to replicate the current proportional to the absolute temperature and inject it throughout the second transistor. A control unit is configured to control the at least one switch of the at least one additional branch and to adapt the resistive value of the first resistor and of the second resistor so as to keep the reference voltage independent of temperature.

The control unit then allows injecting more or less current throughout the second transistor. The injection of a larger amount of current throughout the second transistor allows having a more accurate current and allows reducing an impact of an offset voltage of the operational amplifier on the reference voltage generated by the reference voltage generator circuit. The injection of a smaller amount of current throughout the second transistor allows reducing the electric consumption of the reference voltage generator circuit.

Such a reference voltage generator circuit is configured to reduce the impact of the offset voltage of the operational amplifier to improve the accuracy of the reference voltage, or to reduce its electric consumption according to the needs of the microcontroller.

Such a reference voltage generator circuit has a simple structure and is inexpensive to manufacture.

Furthermore, since the impact of the offset voltage could be limited, it is possible to use an operational amplifier with a reduced size and having a higher offset voltage. In this manner, it is possible to reduce the size of the reference voltage generator circuit. Such a reference voltage generator circuit then occupies less space in the microcontroller.

In an advantageous embodiment, the microcontroller further comprises several electronic modules, the microcontroller having several operating modes allowing selectively powering the electronic modules, the control unit being configured to control the at least one switch of the at least one additional current copier branch according to the active operating mode of the microcontroller so as to inject more or less current throughout the second transistor according to this operating mode.

Hence, such a voltage generator circuit is configured to adapt its operation according to the operating mode of the microcontroller. Hence, such a microcontroller has the advantage of using the same reference voltage generation circuit to generate a reference voltage for different operating modes of the microcontroller.

Preferably, the control unit is configured to control the at least one switch of the at least one additional current copier branch so as to increase the current injected throughout the second transistor when the active operating mode of the microcontroller requests increasing an accuracy of the reference voltage. This active operating mode of the microcontroller may be a normal operating mode.

Advantageously, the control unit is configured to control the at least one switch of the at least one additional current copier branch so as to reduce the current injected throughout the second transistor when the active operating mode of the microcontroller requests reducing an electric consumption of the microcontroller. This active operating mode of the microcontroller may be a low-consumption mode.

In an advantageous embodiment, the control unit is configured to control the at least one switch and to adapt the resistive value of the first resistor and of the second resistor according to the operating mode of the microcontroller from a look-up table associating the different operating modes of the microcontroller to a control of the at least one switch and to resistive values of the first resistor and of the second resistor.

Preferably, the first transistor is a bipolar transistor having an emitter connected to the first resistor, a base and a collector connected to a cold point. Furthermore, the second transistor is a bipolar transistor having an emitter connected to the second input of the operational amplifier and the first terminal of the second resistor, a base, and a collector connected to a cold point, the first transistor and the second transistor having different sizes.

Advantageously, the size of the first transistor is N times greater than the size of the second transistor, N being an integer number greater than or equal to 2, for example equal to 8.

In an advantageous embodiment, the current mirror comprises a first p-channel insulated-gate field-effect transistor and a second p-channel insulated-gate field-effect transistor, this first transistor comprising a gate connected to the output of the operational amplifier, a source configured to receive a power supply voltage and a drain connected to the first input of the operational amplifier and to the first resistor, this second transistor comprising a gate connected to the output of the operational amplifier, a source configured to receive a voltage and a drain connected to the second resistor, this first transistor and this second transistor being identical.

Preferably, the at least one current copier branch comprises a p-channel insulated-gate field-effect transistor comprising a gate connected to the output of the operational amplifier, a source configured to receive a voltage and a drain connected to the first terminal of the second resistor via the at least one switch, this transistor being identical to the first transistor and to the second transistor of the current mirror.

Advantageously, the first input of the operational amplifier is an inverting input and the second input of the operational amplifier is a non-inverting input.

In an advantageous embodiment, the microcontroller further comprises a capacitive element having a first terminal connected to the output of the operational amplifier and a second terminal configured to receive a power supply voltage.

Advantageously, the microcontroller further comprises a temperature sensor including a p-channel insulated-gate field-effect transistor comprising a gate connected to the output of the operational amplifier, a source configured to receive a power supply voltage, and a drain, and a resistor having a first terminal connected to the drain of this transistor and a second terminal connected to a cold point.

Referring now to the drawings, FIG. 1 illustrates a microcontroller MCU comprising different electronic modules MD1, MD2, MD3 and a reference voltage generator circuit BDGP. In this instance, only three electronic modules MD1, MD2, MD3 are represented. Nevertheless, it is possible to provide for more electronic modules.

For example, the electronic modules MD1, MD2, MD3 may comprise electronic modules such as an analog-to-digital converter, a power management unit, a voltage regulator, and a reset circuit.

The reference voltage generator circuit BDGP is configured to generate a reference voltage VREF independent of temperature (the reference voltage generator circuit is referred to by the expression "bandgap voltage reference"). Afterwards, this reference voltage may be used by some electronic modules MD2, MD3 of the microcontroller MCU. In particular, the reference voltage is independent of temperature over a temperature range which may be comprised between −40° C. and 140° C. The reference voltage may be 1.2 Volts.

Moreover, the microcontroller MCU has several operating modes allowing electrically powering the electronic modules MD1, MD2, MD3 in a selective manner.

For example, the microcontroller MCU comprises an operating mode, called normal operating mode, and another operating mode, called low-consumption mode. The normal operating mode corresponds to a mode in which at least most electronic modules MD1, MD2, MD3 of the microcontroller MCU are electrically powered. The low-consumption mode corresponds to a mode in which most electronic modules MD1, MD2, MD3 of the microcontroller MCU are not electrically powered.

In particular, the normal operating mode corresponds to a mode in which the electronic modules of the microcontroller MCU are electrically powered so as to implement their functions to address an application for which the microcontroller MCU is dedicated. For example, in the normal operating mode, the powered electronic modules may consist of digital processing modules, a flash memory, or analog peripheral modules such as an analog-to-digital converter, a digital-to-analog converter, and a power management unit.

The low-consumption mode corresponds to a mode in which most electronic modules of the microcontroller MCU are not electrically powered. This low-consumption mode is used when the application for which the microcontroller MCU is dedicated and does not requires the implementation of the functions of the modules of the microcontroller MCU for a given period of time. For example, in the low-consumption mode, only the reference voltage generator circuit and a power supply monitoring circuit are powered. This power supply monitoring circuit then uses the reference voltage to compare it with the power supply voltage. The low-consumption mode is intended to minimize the electric consumption of the microcontroller MCU when the functions of the microcontroller MCU are not implemented.

In the normal operating mode, at least some of the powered electronic modules generally require receiving a more accurate reference voltage than that required by the few modules powered in the low-consumption mode. The low-consumption mode generally requires minimizing the electric consumption of the reference voltage generator circuit.

The reference voltage generator circuit is configured to adapt its operation to the active operating mode of the microcontroller so as to improve the accuracy of the reference voltage when the microcontroller is in its normal operating mode and so as to reduce its electric consumption when the microcontroller is in its low-consumption mode.

Figure 2:
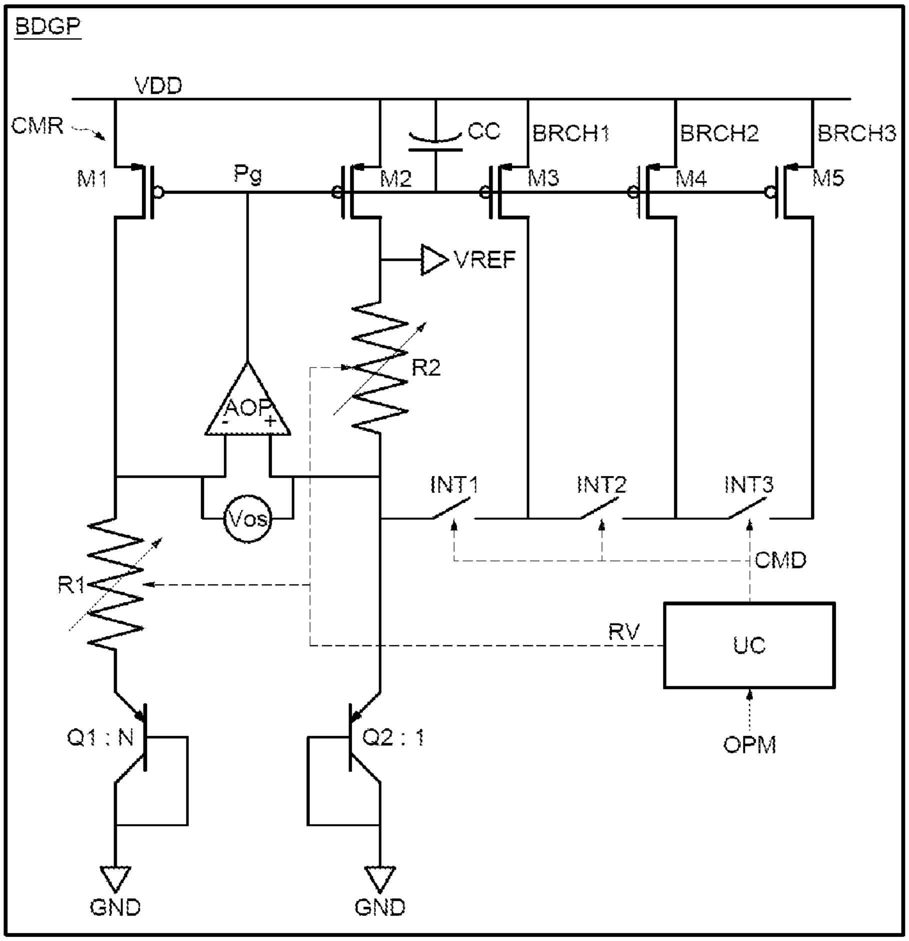
FIG. 2 illustrates an embodiment of a reference voltage generator circuit.

FIG. 2 illustrates an embodiment of the reference voltage generator circuit BDGP.

The reference voltage generator circuit BDGP comprises an operational amplifier AOP, two bipolar transistors Q1, Q2 and a current mirror CMR including two PMOS-type transistors M1 and M2 (i.e. p-channel metal-oxide semiconductor field-effect transistor ("MOSFET")). The reference voltage generator circuit BDGP also comprises two variable resistors R1, R2. The reference voltage generator circuit BDGP also comprises a control unit UC configured to control the resistive value of each variable resistor R1, R2 via a control RV, as described in the following. In this instance, the reference voltage generator circuit BDGP comprises the control unit, nevertheless, alternatively, it is possible to provide for a control unit located outside this reference voltage generator circuit BDGP.

Each of the transistors Q1, Q2 has a base, an emitter and a collector. Each transistor Q1, Q2 is mounted as a diode. In particular, the base of each transistor Q1, Q2 is connected to its collector and to a cold point, for example, grounded GND. The transistors Q1 and Q2 may have different sizes. The size of a bipolar transistor Q1, Q2 corresponds to the surface of the emitter of this bipolar transistor. In particular, the size ratio between the transistors Q1 and Q2 is equal to N. The transistor Q1 then has a size N times larger than that of the transistor Q2. For example, N may be greater than or equal to 2, for example equal to 8.

The operational amplifier AOP has an inverting input connected to the emitter of the transistor Q1 via the variable resistor R1. The operational amplifier AOP also has a non-inverting input connected to the emitter of the transistor Q2.

The transistor M1 has a gate connected to an output of the operational amplifier AOP so as to receive the signal Pg generated by the operational amplifier AOP, a source configured to receive a voltage VDD and a drain connected to the inverting input of the operational amplifier AOP and to the variable resistor R1.

The transistor M2 has a gate connected to the output of the operational amplifier AOP so as to receive the signal Pg generated by the operational amplifier AOP, a source configured to receive a voltage VDD and a drain connected to the non-inverting input of the operational amplifier AOP and to the emitter of the second bipolar transistor Q2 via the variable resistor R2.

Each variable resistor R1, R2 includes several resistive elements able to be activated or deactivated so as to adjust the resistive value of this variable resistor R1, R2. In particular, each variable resistor R1, R2 may be digitally controlled by the control unit UC. In particular, each variable resistor R1, R2 may comprise MOSFET-type transistors controlled by the control unit UC so as to individually activate or deactivate the resistive elements of this variable resistor R1, R2.

The reference voltage generator circuit BDGP has an output connected to a node between the drain of the transistor M2 and the variable resistor R2. This output allows generating a voltage VREF independent of temperature.

The operational amplifier AOP has a direct offset voltage Vos ("offset"). This offset voltage Vos affects the reference voltage VREF generated at the output of the reference voltage generator circuit BDGP.

The reference voltage generator circuit BDGP is configured to adjust the current injected in the bipolar transistor Q2 to limit the impact of the offset voltage Vos of the operational amplifier AOP on the reference voltage VREF.

In particular, the reference voltage generator circuit BDGP comprises several current copier branches BRCH1, BRCH2, BRCH3. These current copier branches BRCH1, BRCH2, BRCH3 are parallel to each other between the power supply and the emitter of the bipolar transistor Q2. For example, in the embodiment illustrated in FIG. 1, the reference voltage generator circuit BDGP comprises three current copier branches BRCH1, BRCH2, BRCH3. Nevertheless, it is possible to provide for a reference voltage generator circuit comprising more or less current copier branches. In particular, the reference voltage generator circuit BDGP comprises a number of current copier branches corresponding to the number of operating modes of the microcontroller MCU.

Each current copier branch BRCH1, BRCH2, BRCH3 comprises a PMOS-type transistor M3, M4, M5. Thus, a first current copier branch BRCH1 comprises a PMOS-type transistor M3, the second current copier branch BRCH2 comprises a PMOS-type transistor M4, and the third current copier branch BRCH3 comprises a PMOS-type transistor M5.

Each of the transistors M3, M4, M5 has a gate connected to the output of the operational amplifier AOP so as to receive the signal Pg generated by the operational amplifier AOP, a source configured to receive a voltage VDD and a drain connected to the non-inverting input of the operational amplifier AOP and to the emitter of the second bipolar transistor Q2. Preferably, the transistors M1, M2, M3, M4, and M5 are identical.

The reference voltage generator circuit BDGP also comprises a capacitive element CC between the power supply and the gate of the transistors M3, M4, and M5. The capacitive element CC allows ensuring stability of the reference voltage generator circuit BDGP.

Furthermore, the current copier branches BRCH1, BRCH2, BRCH3 are connected to the emitter of the transistor Q2 via switches INT1, INT2, INT3. These switches are controlled by the control unit UC. The switches INT1, INT2, INT3 are controlled by the control unit UC so as to adjust the amount of current injected throughout the bipolar transistor Q2.

In particular, the current injected throughout the bipolar transistor Q2 is expressed according to the following formula:

$$I_0 = \frac{\Delta Vbe + Vos}{R1} = \frac{1}{R1} * \left(\frac{k_B \cdot T}{q} * \ln((1+M)\cdot N) + Vos\right),$$

where ΔVbe is the voltage difference between the voltage throughout the transistor Q1 and the voltage throughout the transistor Q2, Vos is the offset voltage of the operational amplifier AOP, R1 is the resistive value of the resistor R1, $k_B$ is a constant is Boltzmann constant, q is the charge of an electron, T is the temperature, N corresponds to the ratio between the size of the bipolar transistors Q1 and Q2, and M is the number of parallel current copier branches used to inject current throughout the bipolar transistor Q2 (according to the closed switches INT1, INT2, INT3). In the embodiment illustrated in FIG. 1, M is comprised between 0 and 3.

The reference voltage VREF generated by the reference voltage generator circuit BDGP is then expressed by the expression:

$$VREF = R2 \cdot I_0 + Vd = \frac{R2}{R1} * (\Delta Vbe + Vos) + Vd$$

$$VREF = \frac{R2}{R1} * \left(\left(\frac{k_B \cdot T}{q} * \ln((1+M)N) + Vos\right)\right) + Vd,$$

where Vd is the diode voltage of the bipolar transistor Q2, R2 is the resistive value of the resistor R2.

The increase in the number M of current copier branches connected to the transistor Q2 allows injecting more current throughout the bipolar transistor Q2 so as to increase the voltage difference ΔVbe to reduce the impact of the offset voltage Vos of the operational amplifier AOP.

The voltage difference is proportional to the absolute temperature (referred to by the acronym "PTAT" standing for "proportional to absolute temperature") and the diode voltage is complementary to the absolute temperature (referred to by the acronym "CTAT" standing for "complementary to absolute temperature").

In order to keep the reference voltage independent of the absolute temperature when the number M of current copier branches used to inject current throughout the bipolar transistor Q2 varies, the control unit is configured to adapt the value of the ratio R2/R1 according to the number M of current copier branches by adapting the resistive value of the resistors R1 and R2.

In particular, the switches INT1, INT2, INT3 allow defining different configurations by varying the number M of current copier branches BRCH1, BRCH2, BRCH3 used to inject current throughout the bipolar transistor Q2. Each of these configurations is associated to a pair of resistive values of the resistors R1 and R2 allowing keeping the reference voltage independent of the absolute temperature. The control unit UC is configured to adapt the resistive values RV of the resistors according to the configuration selected using the switches INT1, INT2, INT3.

The configuration defined using the switches INT1, INT2, INT3 is selected according to the active operating mode of the microcontroller MCU.

In particular, the control unit UC is configured to receive the active operating mode OPM of the microcontroller MCU and to generate a first control CMD to control the switches INT1, INT2, INT3 and a second control RV to adapt the resistive value of the resistors R1 and R2.

In particular, a processor of the microcontroller may be configured to generate a signal indicating the active operating mode OPM upon request of the user of the microcontroller and to transmit this signal to the control unit UC.

In order to improve this accuracy in the normal operating mode, the control unit UC is configured to control the switches INT1, INT2, INT3 so as to increase the number M of current copier branches connected to the transistor Q2 to inject more current throughout the transistor Q2 to reduce the impact of the offset voltage Vos of the operational amplifier AOP on the reference voltage VREF. For example, the control unit UC may be configured to close the switches INT1, INT2, INT3 in order to use all current copier branches BRCH1, BRCH2, BRCH3 to inject current throughout the transistor Q2. The control unit UC then adapts the resistive value of the resistors R1 and R2 according to the number M of current copier branches used to inject more current throughout the transistor Q2 so as to keep the reference voltage VREF independent of temperature.

In order to reduce the consumption of the reference voltage generator circuit in the low-consumption mode, the control unit UC is configured to control the switches INT1, INT2, INT3 to reduce the current injected throughout the transistor Q2 by disconnecting at least one portion of the current copier branches BRCH1, BRCH2, BRCH3. For example, the control unit UC may be configured to open all switches INT1, INT2, INT3 in order to disconnect all current copier branches BRCH1, BRCH2, BRCH3 to reduce the current injected throughout the bipolar transistor Q2. The control unit US then adapts the resistive value RV of the resistors R1 and R2 to keep the reference voltage VREF independent of temperature.

For example, the resistive values of the resistors R1 and R2 adapted for the different configurations able to be defined using the switches INT1, INT2, and INT3 are determined by simulation. In particular, the greater the number M of current copier branches used to inject current in the bipolar transistor Q2, the more it will be suited to reduce the value of the ratio R2/R1.

Hence, the reference voltage generator circuit BDGP is configured to reduce the impact of the offset voltage Vos of the operational amplifier AOP to improve the accuracy of the reference voltage. Hence, it is possible to use an operational amplifier AOP with a reduced size and having a higher offset voltage Vos. In this manner, it is possible to reduce the size of the reference voltage generator circuit. Such a reference voltage generator circuit then occupies less space in the microcontroller.

Such a reference voltage generator circuit BDGP also allows adapting its electric consumption according to the operating mode of the microcontroller.

Furthermore, such a reference voltage generator circuit BDGP has the advantage of having a simple structure.

Figure 3:
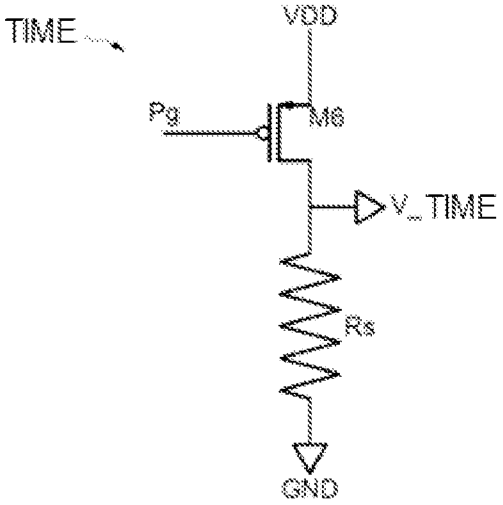
FIG. 3 illustrates a temperature sensor than can be used with a microcontroller.

The microcontroller MCU may also comprise a temperature sensor TEMPS as illustrated in FIG. 3. The temperature sensor comprises a p-channel insulated-gate field-effect transistor M6 comprising a gate connected to the output of the operational amplifier AOP of the reference voltage generator circuit BDGP so as to receive the signal Pg generated by the operational amplifier, a source configured to receive a voltage VDD and a drain. The temperature sensor also comprises a resistor Rs having a first terminal connected to the drain of this transistor M6 and a second terminal connected to the ground GND. The resistor Rs is then crossed by a current proportional to the absolute temperature (PTAT) or independent of the absolute temperature (ZTAT). Thus, the voltage V_TEMPS throughout the resistor Rs is also proportional to the absolute temperature. Thus, it is possible to measure this temperature based on the voltage V_TEMPS. Such a temperature sensor is more accurate because the impact of the offset voltage Vos of the operational amplifier on the current flowing through the resistor Rs is limited thanks to the previously-described reference voltage generator circuit BDGP.

The invention claimed is:

1. A microcontroller comprising a reference voltage generator circuit, wherein the reference voltage generator circuit comprises:

a first transistor coupled as a diode;

a second transistor coupled as a diode;

a first variable resistor, the first transistor and the second transistor being configured to generate a current proportional to an absolute temperature of the first variable resistor;

an operational amplifier having a first input connected to the first transistor via the first variable resistor, and a second input connected to the second transistor;

a second variable resistor having a first terminal connected to the second transistor and to the second input of the operational amplifier and a second terminal connected to a reference voltage node;

a current mirror controlled by an output of the operational amplifier and configured to replicate the current proportional to an absolute temperature of the second variable resistor;

a current copier branch connected to the second transistor via a switch, the current copier branch being configured to replicate the current proportional to the absolute temperature of the second variable resistor and inject the current through the second transistor; and a control unit configured to control the switch of the current copier branch and to adapt resistive values of the first variable resistor and of the second variable resistor so as to keep a reference voltage carried on the reference voltage node independent of temperature.

2. The microcontroller according to claim 1, further comprising a plurality of electronic modules, wherein the microcontroller has a plurality of operating modes to selectively power the electronic modules, the control unit being configured to control the switch of the current copier branch according to an active one of the operating modes of the microcontroller to inject more or less current through the second transistor according to the active one of the operating modes.

3. The microcontroller according to claim 2, wherein the control unit is configured to control the switch of the current copier branch to increase the current injected through the second transistor when the active one of the operating modes of the microcontroller requests increasing an accuracy of the reference voltage.

4. The microcontroller according to claim 2, wherein the control unit is configured to control the switch of the current copier branch to reduce the current injected through the second transistor when the active one of the operating modes of the microcontroller requests reducing a power consumption of the microcontroller.

5. The microcontroller according to claim 2, wherein the control unit is configured to control the switch and to adapt the resistive values of the first variable resistor and of the second variable resistor according to the operating mode of the microcontroller from a look-up table associating the plurality of operating modes of the microcontroller to a control of the switch and to resistive values of the first variable resistor and of the second variable resistor.

6. The microcontroller according to claim 1, wherein the first transistor is a bipolar transistor having an emitter connected to the first variable resistor, a base and a collector both connected to a first cold point;

wherein the second transistor is a bipolar transistor having an emitter connected to the second input of the operational amplifier and the first terminal of the second variable resistor, and also having a base and a collector both connected to a second cold point; and wherein the first transistor and the second transistor have different sizes.

7. The microcontroller according to claim 6, wherein the size of the first transistor is N times greater than the size of the second transistor, N being an integer number greater than or equal to 2.

8. The microcontroller according to claim 6, wherein the first cold point and the second cold point are connected to a ground node.

9. The microcontroller according to claim 1, wherein the current mirror comprises a first p-channel insulated-gate field-effect transistor and a second p-channel insulated-gate field-effect transistor;

wherein the first p-channel insulated-gate field-effect transistor comprises a gate connected to the output of the operational amplifier, a source configured to receive a power supply voltage, and a drain connected to the first input of the operational amplifier and to the first variable resistor;

wherein the second p-channel insulated-gate field-effect transistor comprising a gate connected to the output of the operational amplifier, a source configured to receive a voltage, and a drain connected to the second variable resistor; and wherein the first p-channel insulated-gate field-effect transistor and the second p-channel insulated-gate field-effect transistor are substantially identical.

10. The microcontroller according to claim 9, wherein the current copier branch comprises a third p-channel insulated-gate field-effect transistor comprising a gate connected to the output of the operational amplifier, a source configured to receive a voltage, and a drain connected to the first terminal of the second variable resistor via the switch, the third p-channel insulated-gate field-effect transistor being substantially identical to the first p-channel insulated-gate field-effect transistor and the second p-channel insulated-gate field-effect transistor.

11. The microcontroller according to claim 1, wherein the first input of the operational amplifier is an inverting input and the second input of the operational amplifier is a non-inverting input.

12. The microcontroller according to according to claim 1, further comprising a capacitive element having a first terminal connected to the output of the operational amplifier and a second terminal connected to a power supply voltage node.

13. The microcontroller according to claim 1, further comprising a temperature sensor that comprises:

a p-channel insulated-gate field-effect transistor comprising a gate connected to the output of the operational amplifier, a source connected to a power supply voltage node, and a drain; and a resistor having a first terminal connected to the drain of the p-channel insulated-gate field-effect transistor and a second terminal connected to a cold point.

14. A microcontroller comprising a reference voltage generator circuit, wherein the reference voltage generator circuit comprises:

a first transistor coupled as a diode, the first transistor having a first terminal and a second terminal, the second terminal connected to a ground node;

a second transistor coupled as a diode, the second transistor having a first terminal and a second terminal, the second terminal connected to the ground node;

a first variable resistor having a first terminal connected to the first terminal of the first transistor;

an operational amplifier having a first input connected to a second terminal of the first variable resistor and a second input connected to the first terminal of the second transistor;

a second variable resistor having a first terminal connected to the first terminal of the second transistor and the second input of the operational amplifier, the second variable resistor also having a second terminal connected to a reference voltage node;

a third transistor having a control terminal connected to an output of the operational amplifier and a current path connected between the second terminal of the first variable resistor and a power supply voltage node;

a fourth transistor having a control terminal connected to the output of the operational amplifier and a current path connected between the second terminal of the first variable resistor and the power supply voltage node;

a fifth transistor having a control terminal connected to the output of the operational amplifier and a current path connected between a first node and the power supply voltage node;

a first switch connected between the first node and the second input of the operational amplifier;

a sixth transistor having a control terminal connected to the output of the operational amplifier and a current path connected between a second node and the power supply voltage node;

a second switch connected between the second node and the second input of the operational amplifier;

a seventh transistor having a control terminal connected to the output of the operational amplifier and a current path connected between a third node and the power supply voltage node;

a third switch connected between the third node and the second input of the operational amplifier; and a control unit having first output coupled to the first switch, a second output coupled to the second switch, and a third output coupled to the third switch.

15. The microcontroller according to claim 14, wherein the first transistor is a bipolar transistor having a first size;

wherein the second transistor is a bipolar transistor having a second size; and wherein the first size is N times greater than the second size, N being an integer number greater than or equal to 2.

16. The microcontroller according to claim 14, wherein the third transistor is a p-channel insulated-gate field-effect transistor;

wherein the fourth transistor is a p-channel insulated-gate field-effect transistor; and wherein the third transistor and the fourth transistor are substantially identical.

17. The microcontroller according to claim 16, wherein the fifth transistor is a p-channel insulated-gate field-effect transistor;

wherein the sixth transistor is a p-channel insulated-gate field-effect transistor;

wherein the seventh transistor is a p-channel insulated-gate field-effect transistor; and wherein the third, fourth, fifth, sixth, and seventh transistors are substantially identical.

18. The microcontroller according to claim 14, further comprising a capacitive element having a first terminal connected to the output of the operational amplifier and a second terminal connected to the power supply voltage node.

19. The microcontroller according to claim 14, further comprising a temperature sensor that comprises:

a p-channel insulated-gate field-effect transistor comprising a gate connected to the output of the operational amplifier, a source connected to the power supply voltage node, and a drain; and a resistor having a first terminal connected to the drain of the p-channel insulated-gate field-effect transistor and a second terminal connected to the ground node.

20. A method of operating a reference voltage generator circuit that comprises a first transistor coupled as a diode, a second transistor coupled as a diode, a first variable resistor coupled between the first transistor and a power supply voltage node, and a second variable resistor coupled between the second transistor and the power supply voltage node, the method comprising:

operating the reference voltage generator circuit so that a first branch that includes the first transistor and the first variable resistor conducts a current proportional to an absolute temperature of the first variable resistor;

mirroring the current conducted by the first branch to generate a current through a second branch that includes the second transistor and the second variable resistor, the current through the second branch being proportional to an absolute temperature of the second variable resistor;

replicating the current proportional to the absolute temperature of the second variable resistor in a plurality of current copier branches;

controlling an amount of current being injected through the second transistor from the current copier branches; and adapting resistive values of the first variable resistor and of the second variable resistor so as to keep a reference voltage independent of temperature.

21. The method of claim 20, wherein the reference voltage generator circuit is part of a microcontroller that also includes a plurality of electronic modules, wherein the microcontroller has a plurality of operating modes to selectively power the electronic modules, wherein the amount of current being injected is controlled according to an active one of the operating modes of the microcontroller to inject more or less current through the second transistor.

22. The method according to claim 21, wherein controlling the amount of current being injected comprises increasing the current injected through the second transistor when the active one of the operating modes of the microcontroller requests increasing an accuracy of the reference voltage.

23. The method according to claim 21, wherein controlling the amount of current being injected comprises reducing the current injected through the second transistor when the active one of the operating modes of the microcontroller requests reducing a power consumption of the microcontroller.

24. The method according to claim 21, wherein controlling the amount of current being injected and adapting the resistive values are performed according to the operating mode of the microcontroller based on a look-up table.

* * * * *